(12) United States Patent
Chen et al.

(10) Patent No.: US 12,259,302 B2
(45) Date of Patent: Mar. 25, 2025

(54) TEST FIXTURE FOR SUPPORTING A DEVICE UNDER TEST

(71) Applicants: INVENTEC (PUDONG) TECHNOLOGY CORPORATION, Shanghai (CN); INVENTEC CORPORATION, Taipei (TW)

(72) Inventors: Hsin Hua Chen, Taipei (TW); Chun-Ming Lu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 136 days.

(21) Appl. No.: 18/205,822

(22) Filed: Jun. 5, 2023

(65) Prior Publication Data

US 2024/0310239 A1   Sep. 19, 2024

(30) Foreign Application Priority Data

Mar. 14, 2023   (CN) .......................... 202310246731.3

(51) Int. Cl.
*G01M 7/02* (2006.01)

(52) U.S. Cl.
CPC .................................. *G01M 7/027* (2013.01)

(58) Field of Classification Search
CPC .......... G01M 7/027; G01M 7/00; G01M 7/02; G01M 7/045; G01M 7/06; G01M 7/08
See application file for complete search history.

(56) References Cited

U.S. PATENT DOCUMENTS

| 4,875,374 A | * | 10/1989 | Pinson | G01M 7/06 73/663 |
| 5,083,463 A | * | 1/1992 | Marshall | G01M 7/06 73/663 |
| 2015/0185108 A1 | * | 7/2015 | Baek | G01M 7/022 73/669 |
| 2016/0076966 A1 | * | 3/2016 | Khulief | G01M 7/06 73/663 |
| 2018/0156689 A1 | * | 6/2018 | McGranahan | G01M 7/027 |
| 2018/0321111 A1 | * | 11/2018 | Matsumoto | B06B 1/045 |

FOREIGN PATENT DOCUMENTS

CN   110375941 A  *  10/2019 ............ G01M 7/027

* cited by examiner

*Primary Examiner* — Suman K Nath
(74) *Attorney, Agent, or Firm* — Maschoff Brennan

(57) ABSTRACT

A test fixture configured to support a DUT (device under test) and including a bottom base, two mounting bases, a rotatable base and a supporting base. The two mounting bases stand on a side of the bottom base and are spaced apart from each other. The rotatable base is rotatably disposed on the two mounting bases. At least a part of the rotatable base is located between the two mounting bases. The supporting base is fixed on a side of the rotatable base and configured to support the DUT. When the supporting base is parallel to the bottom base, the supporting base is located on a side of the rotatable base located farthest away from the bottom base.

8 Claims, 8 Drawing Sheets

TEST FIXTURE FOR SUPPORTING A DEVICE UNDER TEST

CROSS-REFERENCE TO RELATED APPLICATIONS

This non-provisional application claims priority under 35 U.S.C. § 119(a) on Patent Application No(s). 202310246731.3 filed in China, on Mar. 14, 2023, the entire contents of which are hereby incorporated by reference.

BACKGROUND OF THE INVENTION

Technical Field of the Invention

The invention relates to a test fixture, more particularly to a test fixture including a rotatable base.

Description of the Related Art

In general, in order to meet the strict specification for high-frequency vibration related to the automotive electronic products, a high-frequency vibration test is required to be performed under a frequency higher than 2000 Hertz (HZ) for the automotive electronic products. Such vibration test is performed by a test fixture supporting the automotive electronic product to be tested.

However, conventional test fixture is less rigid due to the geometric shape, mechanical properties or assembly method thereof. Thus, in the conventional test fixture, a global mode for the entire test fixture usually occurs after a local mode for parts of the test fixture or assembling area of such parts. In this way, not only the resonant frequency of the test fixture is reduced, but also the test result is distorted by the load caused on the automotive electronic products during the vibration test. In addition, in some conventional test fixtures, excessive supporting components are included to enhance the rigidity or the clamping force of the test fixture. However, such excessive supporting components cause unnecessary resonance mode.

SUMMARY OF THE INVENTION

The invention is to provide a test fixture with improved rigidity and being able to undergo high frequency vibration test without the occurrence of the local mode.

One embodiment of this invention provides a test fixture configured to support a DUT (device under test) and including a bottom base, two mounting bases, a rotatable base and a supporting base. The two mounting bases stand on a side of the bottom base and are spaced apart from each other. The rotatable base is rotatably disposed on the two mounting bases. At least a part of the rotatable base is located between the two mounting bases. The supporting base is fixed on a side of the rotatable base and configured to support the DUT. When the supporting base is parallel to the bottom base, the supporting base is located on a side of the rotatable base located farthest away from the bottom base.

According to the test fixture disclosed by above embodiments, at least a part of the rotatable base is located between the two mounting bases, and the supporting base is located on the side of the rotatable base located farthest away from the bottom base when being parallel to the bottom base. Due to such assembling manner, the test fixture becomes more rigid and the local vibration is prevented from occurring in the test fixture at low frequency. That is, the local mode is prevented from occurring in the test fixture. In this way, even though the DUT is an automotive electronic product, the resonance frequency of the test fixture is still high enough to allow the test fixture to undergo a vibration test under a frequency higher than 2000 Hz. Further, the resonance between the test fixture and the DUT is also prevented, thereby preventing the test result from being distorted.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
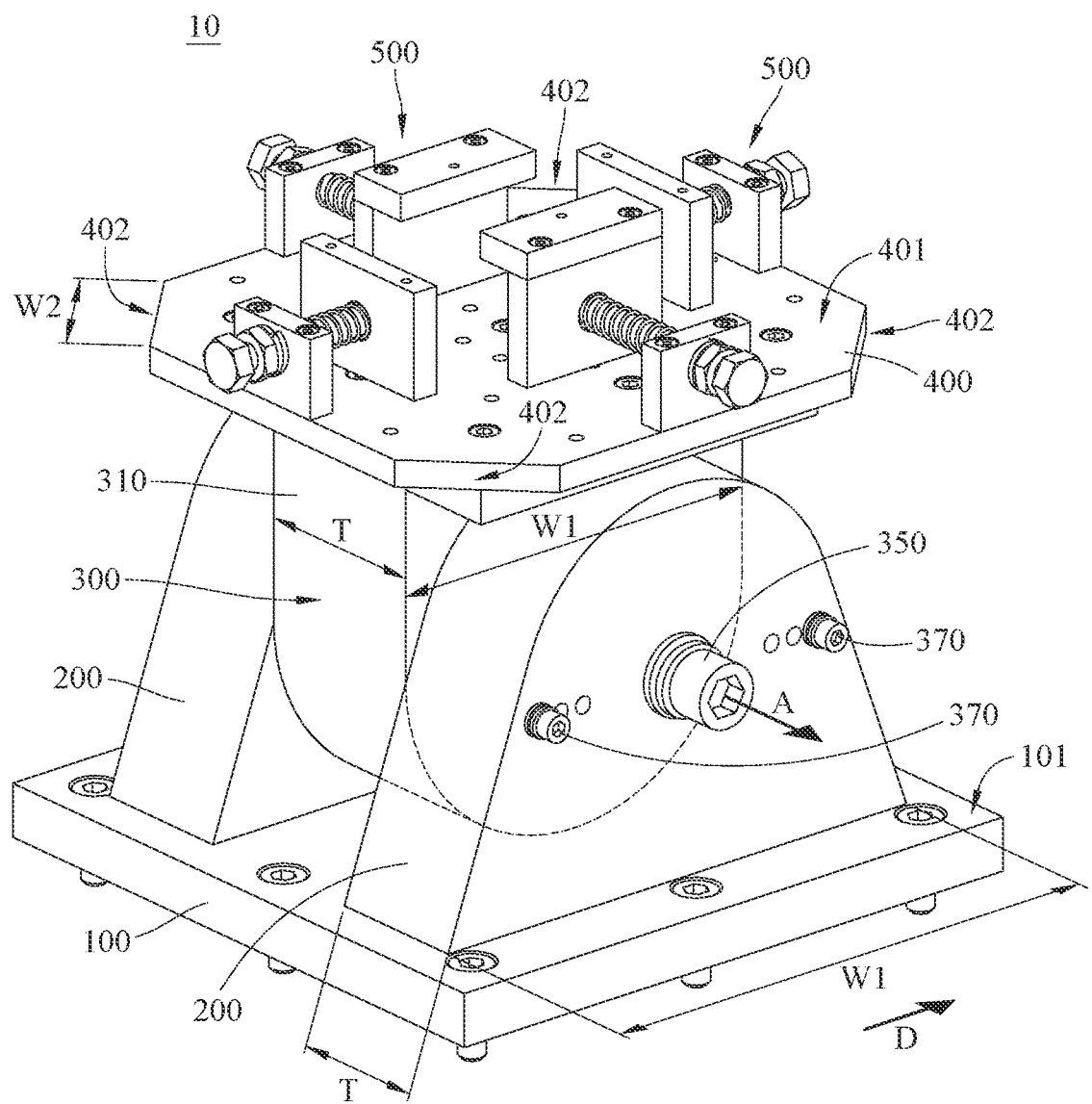
FIG. 1 is a perspective view of a test fixture according to a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
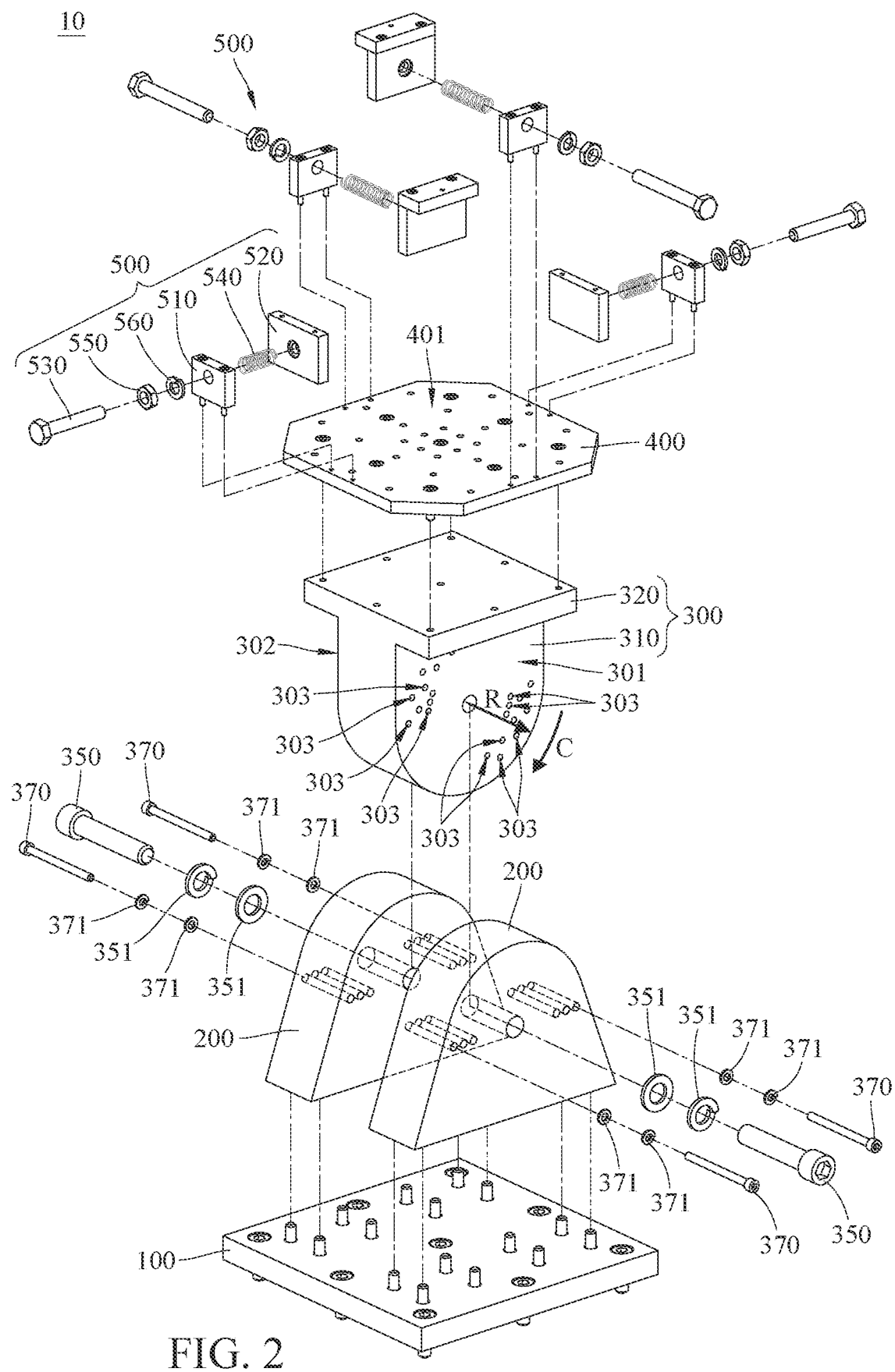
FIG. 2 is an exploded view of the test fixture in FIG. 1.

Please refer to FIGS. 1 and 2. FIG. 1 is a perspective view of a test fixture 10 according to a first embodiment of the invention. FIG. 2 is an exploded view of the test fixture 10 in FIG. 1.

The test fixture 10 is, for example, a vibration test fixture. In this embodiment, the test fixture 10 includes a bottom base 100, two mounting bases 200, a rotatable base 300, two pivots 350, a plurality of positioning bolts 370, a supporting base 400 and a plurality of fixing assemblies 500.

The two mounting bases 200 stand on the same side of the bottom base 100, and are spaced apart from each other. In this embodiment, the rotatable base 300 includes a rotatable body 310 and a mounting body 320 fixed on a side of the rotatable body 310. The rotatable body 310 is located between the two mounting bases 200, and rotatably disposed on the two mounting bases 200. In this embodiment, the rotatable body 310 is pivotally connected to the two mounting bases 200 via the two pivots 350, respectively.

Note that for the brevity of the drawings, the screw threads of the bolts and the screw holes are omitted in the drawings of this invention.

In addition, in this embodiment, the rotatable body 310 includes a first mounting surface 301, a second mounting surface 302 and a plurality of positioning screw holes 303. The first mounting surface 301 and the second mounting surface 302 face away from each other, and face the two mounting bases 200. Note that the connection relationships between the positioning screw holes 303 on the first mounting surface 301 and the corresponding positioning bolts 370 are similar to those between the positioning screw holes 303 on the second mounting surface 302 and the corresponding positioning bolts 370. Thus, only the connection relationships between the positioning screw holes 303 on the first mounting surface 301 and the corresponding positioning bolts 370 will be described hereinafter.

On the first mounting surface 301, the positioning screw holes 303 are arranged into multiple groups of positioning screw holes 303 along a radial direction R of the pivot 350. The positioning screw holes 303 of the same group are spaced apart from the pivot 350 by the same radial distance, and arranged along a circumferential direction C of the pivot 350. Two of the positioning bolts 370 are fixed in two of the positioning screw holes 303, respectively.

The positioning bolts 370 are disposed through the two mounting bases 200, respectively. Note that in other embodiments, the test fixture may merely include one positioning bolt. Alternatively, in still other embodiments, the test fixture may not include the positioning bolts, and the rotatable base may not include the positioning screw holes.

In this embodiment, the two pivots 350 are, for example, bolts. In addition, the two pivots 350 and the positioning bolts 370 each include, for example, a first portion with screw threads and a second portion without screw threads, where the first portion is fixed to the rotatable body 310 and the second portion is rotatably disposed through the mounting bases 200.

In this embodiment, there may be a plurality of pads 351 clamped between a part of each pivot 350 and the corresponding mounting base 200. In addition, in this embodiment, there may be a plurality of pads 371 clamped between each positioning bolt 370 and the corresponding mounting base 200.

The supporting base 400 is fixed on a side of the rotatable base 300. In detail, the supporting base 400 is fixed on a side of the mounting body 320 located farthest away from the rotatable body 310. As shown in FIG. 1, when the supporting base 400 is parallel to the bottom base 100, the supporting base 400 is located on a side of the rotatable base 300 located farthest away from the bottom base 100. In this embodiment, the supporting base 400 includes a supporting surface 401 facing away from the rotatable base 300.

In this embodiment, the fixing assemblies 500 are disposed on the supporting surface 401. In this embodiment, each fixing assembly 500 includes a fixed block 510, a movable block 520, a bolt 530 and an elastic component 540. The fixed block 510 is fixed on the supporting surface 401. The movable block 520 is movably disposed on the supporting surface 401, and is spaced apart from the fixed block 510. The bolt 530 is movably disposed through the fixed block 510, and an end portion of the bolt 530 having screw threads is fixed in the movable block 520. The elastic component 540 is sleeved on the bolt 530, and two opposite ends of the elastic component 540 press against the fixed block 510 and the movable block 520, respectively. Furthermore, each fixing assembly 500 may further include a nut 550 and a pad 560. The nut 550 is located on a side of the fixed block 510 located farthest away from the movable block 520, and the pad 560 is clamped between the fixed block 510 and the nut 550.

Further, as shown in FIG. 1, in this embodiment, a thickness T of each of the two mounting bases 200 and the rotatable base 300 along an axial direction A of the pivot 350 ranges from, for example, 50 millimeters (mm) to 80 mm. Also, for example, a ratio of the thickness T of each of the mounting bases 200 and the rotatable base 300 along the axial direction A to a width W1 of each of the two mounting bases 200 and the rotatable base 300 along a width direction D perpendicular to the axial direction A ranges from 0.3 to 0.5. Due to such size design, the rigidity of the test fixture 10 of this invention is further enhanced to prevent the local mode from occurring.

Moreover, as shown in FIG. 1, in this embodiment, the supporting base 400 further includes a plurality of notches 402. The notches 402 are located on the corners of the supporting base 400, respectively. A width W2 of each notch 402 ranges, for example, from 30 mm to 50 mm. Due to the notches 402 and the size design thereof, the rigidity of the test fixture 10 of this invention is further enhanced to prevent the local mode from occurring.

Additionally, in this embodiment, the two mounting bases 200 direct clamp the rotatable base 300 to increase the binding contact area to 80 percent or more, thereby further enhancing the rigidity of the test fixture 10 to prevent the local mode from occurring.

Further, as shown in FIG. 1, in this embodiment, a height, a width and a length of an assembly of the two mounting bases 200, the rotatable base 300 and the supporting base 400 are nearly equal. That is, a space between the supporting surface 401 of the supporting base 400 and a top surface 101 of the bottom base 100 facing the mounting bases 200 is in, for example, a cubic shape.

Figure 3:
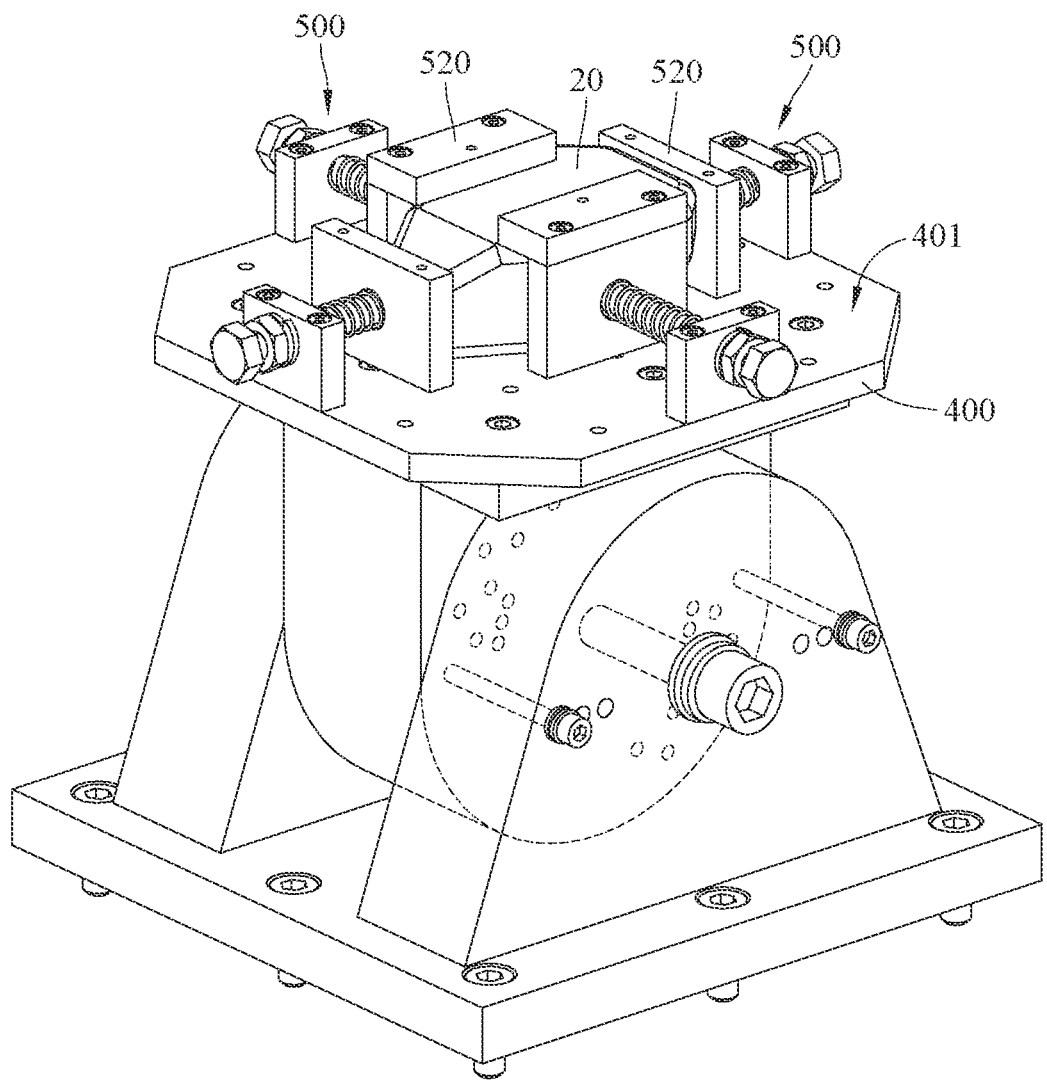
FIG. 3 is a perspective view showing that a device under test (DUT) is fixed on fixing assemblies of the test fixture in FIG. 1.

Please refer to FIG. 3. FIG. 3 is a perspective view showing that a device-under-test (DUT) 20 is fixed on the fixing assemblies 500 of the test fixture 10 in FIG. 1.

The supporting surface 401 of the supporting base 400 is configured to support the DUT 20. The movable blocks 520 of the fixing assemblies 500 clamp the DUT 20 so as to fix the DUT 20 on the supporting surface 401.

Figure 4:
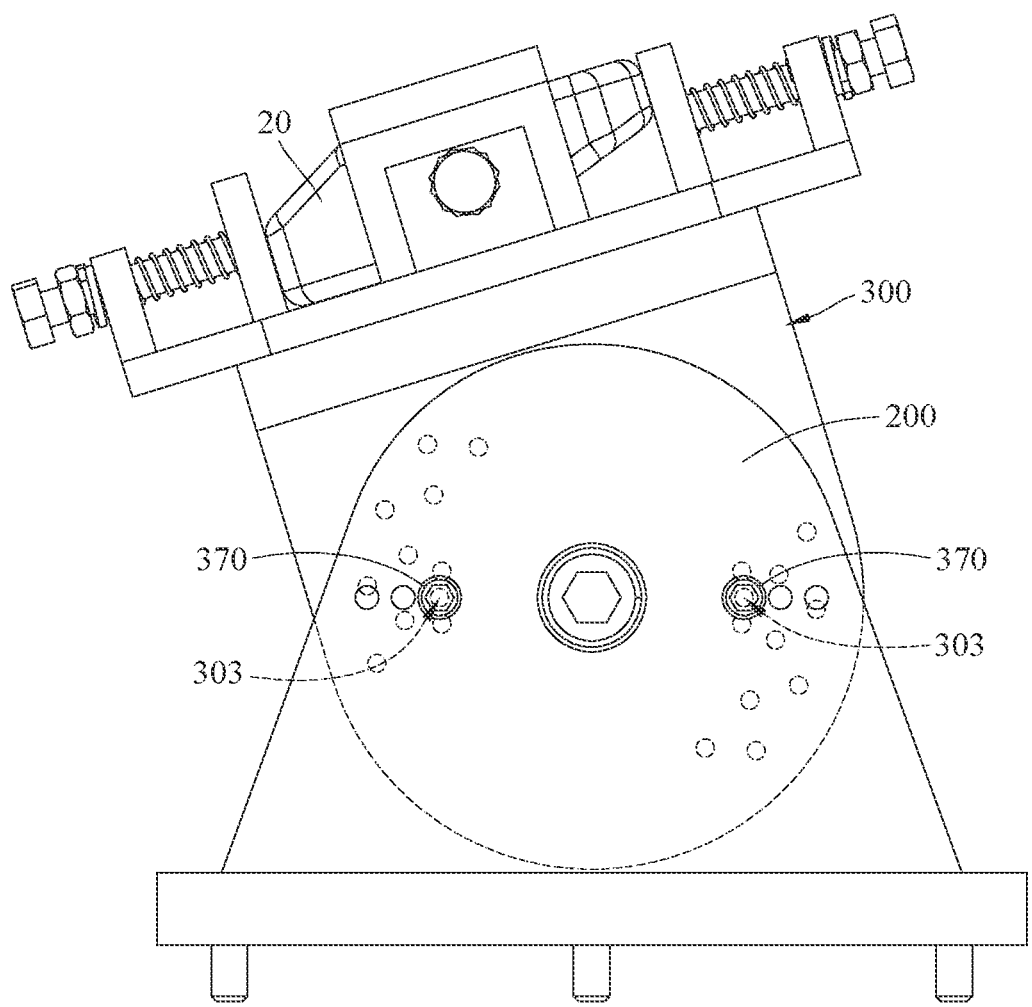
FIG. 4 is a side view showing that the DUT is rotated along with a rotatable base and a supporting base of the test fixture in FIG. 3.

Please refer to FIG. 4. FIG. 4 is a side view showing that the DUT 20 is rotated along with the rotatable base 300 and the supporting base 400 of the test fixture 10 in FIG. 3.

As shown in FIG. 4, when the actual angle of the DUT 20 should be simulated by rotating the rotatable base 300 relative to the mounting bases 200 according to the specification of the test, the positioning bolts 370 are firstly removed from the rotatable base 300 and the mounting bases 200, and then the rotatable base 300 is rotated to a desired angle relative to the mounting bases 200. Then, the positioning bolts 370 are disposed through the mounting bases 200 and the positioning screw holes 303 of the rotatable base 300 corresponding to the desired angle, thereby positioning the rotatable base 300 at the desired angle. In this embodiment, the DUT 20 is, for example, an automotive electronic product, such as an automotive display, of various sizes.

In this embodiment, a part of the rotatable base 300 is located between the two mounting bases 200, and the supporting base 400 is located on the side of the rotatable base 300 located farthest away from the bottom base 100 when being parallel to the bottom base 100. Due to such assembling manner, the local mode of the parts of the test fixture 10 is prevented. Accordingly, even though the DUT 20 is an automotive electronic product, the resonance frequency of the test fixture 10 is still high enough to allow the test fixture 10 to undergo a vibration test under a frequency higher than 2000 Hz. Further, the resonance between the test fixture 10 and the DUT 20 is also prevented, thereby preventing the test result from being distorted.

According to the test result, a frequency of the vibration test for a first vibration mode of the test fixture 10 according to the first embodiment of the invention has been increased to 2351 Hz that is over 2300 Hz. Also, a frequency for the second vibration mode and a frequency for the third vibration mode are 2392 Hz and 3151 Hz, respectively. Thus, such frequencies for the first to third vibration modes have met the requirement of being higher than 2000 Hz for automotive electronics.

Other embodiments are described below for illustrative purposes. It is to be noted that the following embodiments use the reference numerals and a part of the contents of the above embodiments, the same reference numerals are used to denote the same or similar elements, and the description of the same technical contents is omitted. For the description of the omitted part, reference may be made to the above embodiments, and details are not described in the following embodiments.

Figure 5:
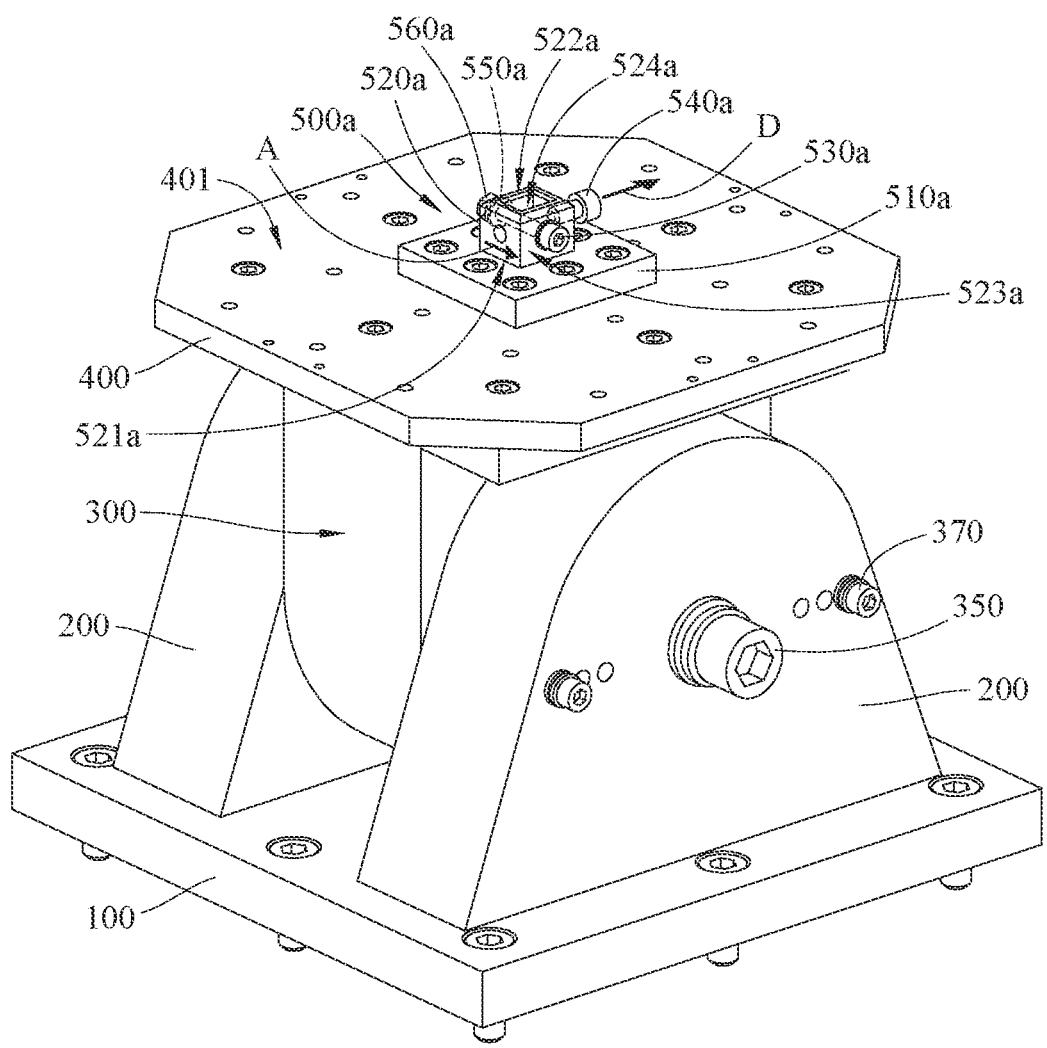
FIG. 5 is a perspective view of a test fixture according to a second embodiment of the invention.
Figure 6:
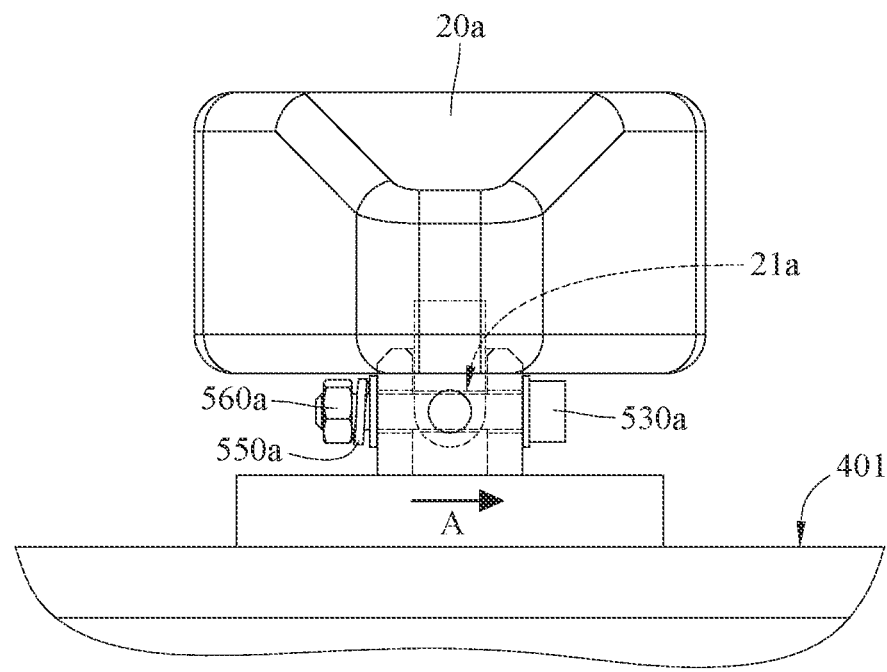
FIG. 6 is a front view showing that a DUT is fixed by a fixing assembly of the test fixture in FIG. 5.
Figure 7:
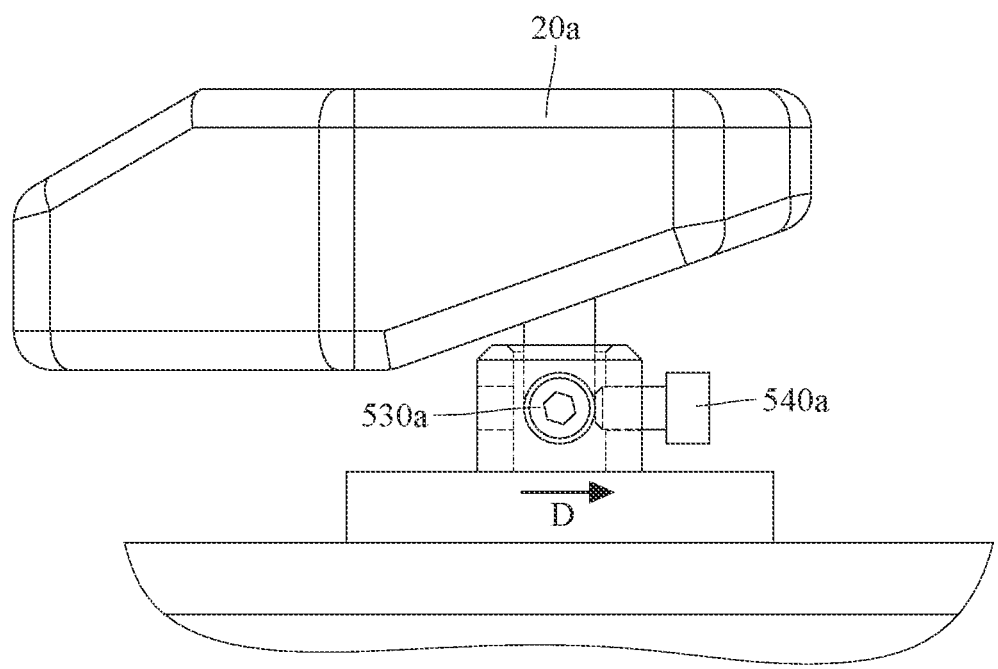
FIG. 7 is a side view showing that the DUT is fixed by the fixing assembly of the test fixture in FIG. 5.

The invention is not limited to the configuration of the fixing assembly. Please refer to FIG. 5. FIG. 5 is a perspective view of a test fixture 10a according to a second embodiment of the invention. The only difference between the test fixture 10a of this embodiment and the test fixture 10 of the first embodiment is the configuration of a fixing assembly 500a of this embodiment. In detail, in this embodiment, there is one fixing assembly 500a. In this embodiment, the fixing assembly 500a includes a fixed base 510a, an assembling base 520a, a first bolt 530a and a second bolt 540a. The fixed base 510a is fixed on the supporting surface 401. The assembling base 520a is fixed on a side of the fixed base 510a located farthest away from the supporting surface 401. The assembling base 520a includes a bottom surface 521a, a top surface 522a, a side peripheral surface 523a and a recess 524a. The bottom surface 521a faces the fixed base 510a. The top surface 522a faces away from the bottom surface 521a. The side peripheral surface 523a connects the top surface 522a and the bottom surface 521a. The recess 524a is located on the top surface 522a. Please refer to FIGS. 5 to 7. FIG. 6 is a front view showing that a DUT 20a is fixed by the fixing assembly 500a of the test fixture 10a in FIG. 5. FIG. 7 is a side view showing that the DUT 20a is fixed by the fixing assembly 500a of the test fixture 10a in FIG. 5. The first bolt 530a is disposed through two opposite side of the side peripheral surface 523a along the axial direction A of the pivot 350. The second bolt 540a is disposed through a side of the side peripheral surface 523a along the width direction D of the mounting bases 200. The second bolt 540a and the first bolt 530a are disposed through two adjacent sides of the side peripheral surface 523a, respectively. In addition, in this embodiment, there may be a pad 550a and a nut 560a fixed to an end of the first bolt 530a and sequentially resting on a side of the side peripheral surface 523a. Note that the invention is not limited by the extension directions of the first bolt 530a and the second bolt 540a. In other embodiments, the first bolt may be disposed through the side peripheral surface along another direction non-parallel to the axial direction, and the second bolt may be disposed through the side peripheral surface along another direction non-parallel to the width direction.

As shown in FIGS. 6 and 7, the first bolt 530a is configured to be disposed through a fixing hole 21a of the DUT 20a, thereby fixing the DUT 20a on the supporting surface 401. Then, the second bolt 540a is configured to push a part of the DUT 20a forming the fixing hole 21a to prevent the DUT 20a from being rotated.

Figure 8:
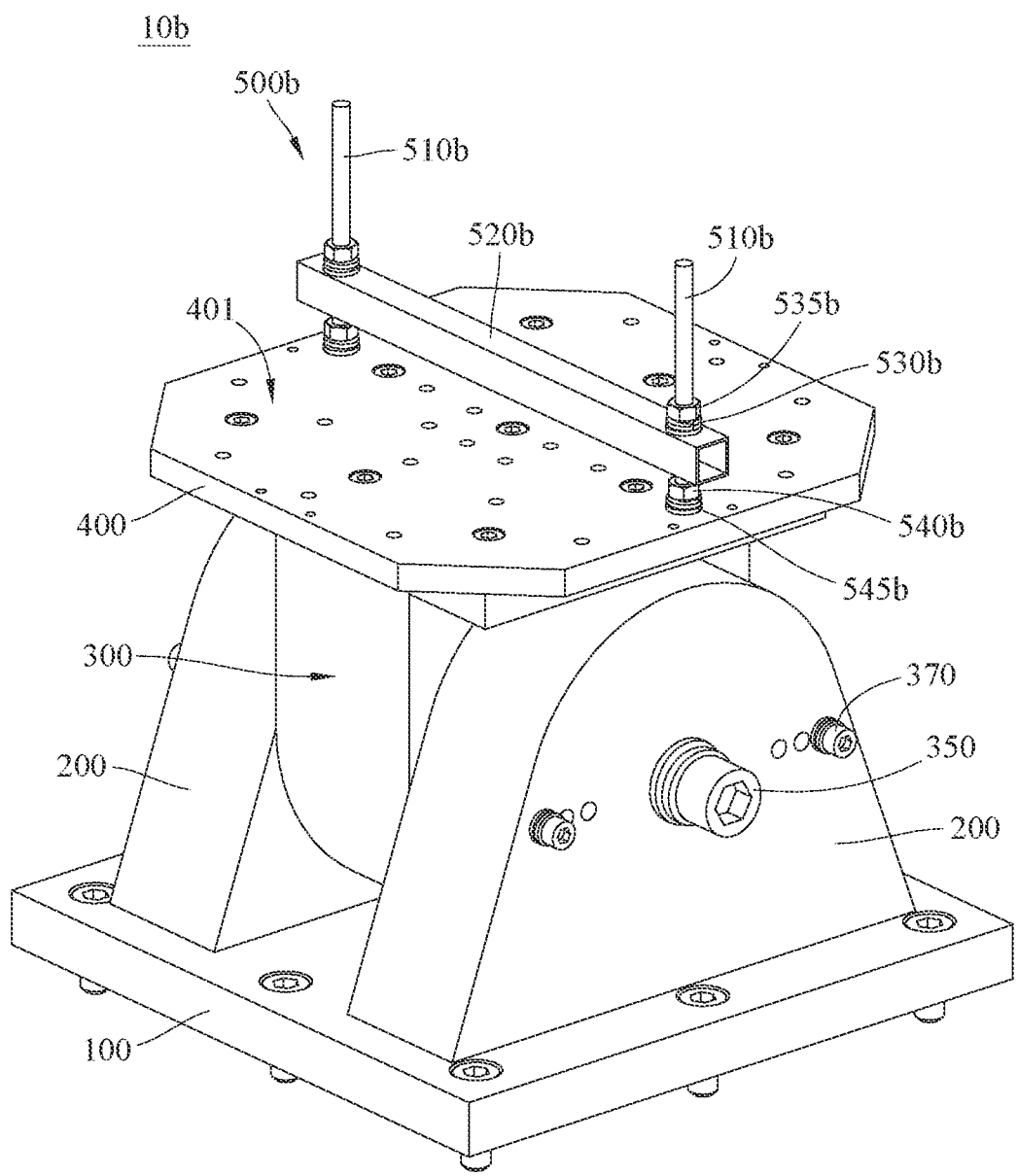
FIG. 8 is a perspective view of a test fixture according to a third embodiment of the invention.

Alternatively, please refer to FIG. 8. FIG. 8 is a perspective view of a test fixture 10b according to a third embodiment of the invention. The only difference between the test fixture 10b of this embodiment and the test fixture 10 of the first embodiment is the configuration of a fixing assembly 500b of this embodiment. In detail, there is one fixing assembly 500b. In this embodiment, the fixing assembly 500b includes two bolts 510b and a pressing bar 520b. The two bolts 510b are disposed through and fixed to the supporting base 400. The two bolts 510b protrude from the supporting surface 401 along a direction away from the rotatable base 300. The pressing bar 520b are fixed on a part of each bolt 510b that protruding out of the supporting surface 401. In this embodiment, there may be a plurality of pads 530b and two nuts 535b respectively fixed to the two bolts 510b and sequentially stacked on a side of the pressing bar 520b located farthest away from the supporting base 400. Further, in this embodiment, there may be two nuts 540b and a plurality of pads 545b respectively fixed to the two bolts 510b and sequentially staked on a side of the pressing bar 520b located closest to the supporting base 400.

Figure 9:
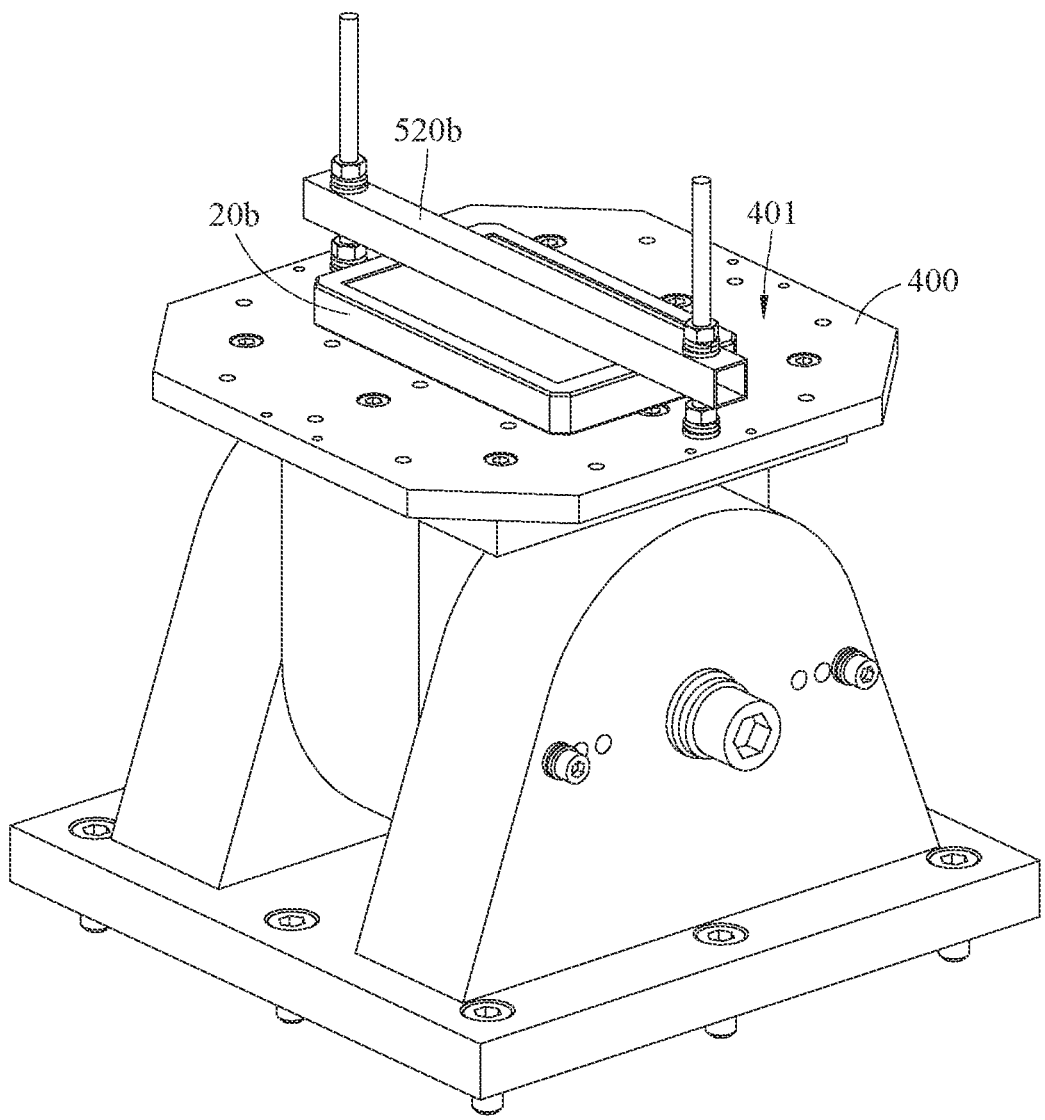
FIG. 9 is a perspective view showing that a DUT is fixed by a fixing assembly of the test fixture in FIG. 8.

Please refer to FIG. 9. FIG. 9 is a perspective view showing that a DUT 20b is fixed by the fixing assembly 500b of the test fixture 10b in FIG. 8. As shown in FIG. 9, the pressing bar 520b and the supporting base 400 are configured to clamp the DUT 20b to fix the DUT 20b on the supporting surface 401.

Not that in still other embodiments, the test fixture may not include the fixing assembly, and an external structure or device may be used to fix the DUT on the supporting surface of the supporting base.

According to the test fixture disclosed by above embodiments, at least a part of the rotatable base is located between the two mounting bases, and the supporting base is located on the side of the rotatable base located farthest away from the bottom base when being parallel to the bottom base. Due to such assembling manner, the test fixture becomes more rigid and the local vibration is prevented from occurring in the test fixture at low frequency. That is, the local mode is prevented from occurring in the test fixture. In this way, even though the DUT is an automotive electronic product, the resonance frequency of the test fixture is still high enough to allow the test fixture to undergo a vibration test under a frequency higher than 2000 Hz. Further, the resonance between the test fixture and the DUT is also prevented, thereby preventing the test result from being distorted.

In an embodiment of the invention, the test fixture of this invention may be used to test automotive electronic products that may be applied to automotive device, such as autonomous cars, electric car or partially autonomous cars.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A test fixture, configured to support a device under test (DUT), the test fixture comprising:
    a bottom base;
    two mounting bases, standing on a side of the bottom base and being spaced apart from each other;
    a rotatable base, rotatably disposed on the two mounting bases, wherein at least a part of the rotatable base is located between the two mounting bases; and
    a supporting base, fixed on a side of the rotatable base and configured to support the DUT, wherein when the supporting base is parallel to the bottom base, the supporting base is located on a side of the rotatable base located farthest away from the bottom base;

wherein the test fixture further comprising at least one fixing assembly, wherein the supporting base comprises a supporting surface, the supporting surface faces away from the rotatable base and is configured to support the DUT, and the at least one fixing assembly is disposed on the supporting surface and configured to fix the DUT on the supporting surface;

wherein the at least one fixing assembly comprises a plurality of fixing assemblies each comprising:

a fixed block, fixed on the supporting surface;

a movable block, movably disposed on the supporting surface and spaced apart from the fixed block;

a bolt, movably disposed through the fixed block, wherein an end of the bolt is fixed in the movable block; and an elastic component, sleeved on the bolt, and wherein two opposite ends of the elastic component press against the fixed block and the movable block, respectively;

the plurality of movable blocks of the plurality of fixing assemblies are configured to clamp the DUT.

2. The test fixture according to claim 1, wherein the at least one fixing assembly comprises:

two bolts, disposed through and fixed to the supporting base, wherein the two bolts protrude from the supporting surface along a direction away from the rotatable base; and a pressing bar, fixed on a part of each of the two bolts protruding out of the supporting surface, wherein the pressing bar and the supporting base are configured to clamp the DUT.

3. The test fixture according to claim 1, further comprising two pivots and at least one positioning bolt, wherein the rotatable base are pivotally connected to the two mounting bases via the two pivots, respectively, the rotatable base comprises a first mounting surface, a second mounting surface and a plurality of positioning screw holes, the first mounting surface and the second mounting surface face away from each other and face the two mounting bases, respectively, the plurality of positioning screw holes are arranged on the first mounting surface or the second mounting surface along a circumferential direction of the two pivots, and the at least one positioning bolt is disposed through one of the two mounting bases and fixed in one of the plurality of positioning screw holes.

4. The test fixture according to claim 3, wherein a thickness of each of the two mounting bases and the rotatable base along an axial direction of the two pivots ranges from 50 millimeters (mm) to 80 mm.

5. The test fixture according to claim 4, wherein a ratio of the thickness of each of the two mounting bases and the rotatable base along the axial direction to a width of each of the two mounting bases and the rotatable base along a width direction perpendicular to the axial direction ranges from 0.3 to 0.5.

6. The test fixture according to claim 1, wherein the supporting base comprises a plurality of notches located on a plurality of corners of the supporting base, respectively.

7. The test fixture according to claim 6, wherein a width of each of the plurality of notches ranges from 30 mm to 50 mm.

8. A test fixture, configured to support a device under test (DUT), the test fixture comprising:

a bottom base;

two mounting bases, standing on a side of the bottom base and being spaced apart from each other;

a rotatable base, rotatably disposed on the two mounting bases, wherein at least a part of the rotatable base is located between the two mounting bases; and a supporting base, fixed on a side of the rotatable base and configured to support the DUT, wherein when the supporting base is parallel to the bottom base, the supporting base is located on a side of the rotatable base located farthest away from the bottom base;

wherein the test fixure further comprises at least one fixing assembly, the supporting base comprises a supporting surface, the supporting surface faces away from the rotatable base and is configured to support the DUT, and the at least one fixing assembly is disposed on the supporting surface and configured to fix the DUT on the supporting surface;

wherein the at least one fixing assembly comprises:

a fixed base, fixed on the supporting surface;

an assembling base, fixed on a side of the fixed base located farthest away from the supporting surface, wherein the assembling base comprise a bottom surface, a top surface, a side peripheral surface, a recess, the bottom surface faces the fixed base, the top surface faces away from the bottom surface, the side peripheral surface connects the top surface and the bottom surface, the recess is located on the top surface;

a first bolt, disposed through two opposite sides of the side peripheral surface and configured to be disposed through a fixing hole of the DUT; and a second bolt, disposed through the side peripheral surface and configured to push the DUT, wherein the first bolt and the second bolt are disposed through two adjacent sides of the side peripheral surface, respectively.

* * * * *